United States Patent
Rosen et al.

(10) Patent No.: US 6,567,675 B1
(45) Date of Patent: May 20, 2003

(54) PROGRAMMABLE AUTOMATIC PREFIX DIALER FOR WIRELESS

(76) Inventors: Howard B. Rosen, 1 Lyncroft Rd., Montreal, Quebec (CA), H3X 3E3; Robert M. Nelson, 207 Eton Cr., Hampstead, Qc. (CA), H3X 3K4

( * ) Notice: Subject to any disclaimer, the term of this patent is extended or adjusted under 35 U.S.C. 154(b) by 0 days.

(21) Appl. No.: 09/223,153

(22) Filed: Dec. 30, 1998

Related U.S. Application Data

(63) Continuation-in-part of application No. 08/811,710, filed on Mar. 5, 1997, now Pat. No. 5,859,896.
(51) Int. Cl.$^7$ ................................................ H04Q 7/20
(52) U.S. Cl. ...................... 455/564; 455/550; 455/565; 379/355.05; 379/355.07; 379/355.08
(58) Field of Search ........................ 455/550, 90, 564, 455/565, 575, 74.1; 379/355.01, 355.02, 355.03, 355.05, 355.06, 355.07, 355.08

(56) References Cited

U.S. PATENT DOCUMENTS

| | | | |
|---|---|---|---|
| 4,658,096 A | * 4/1987 | West, Jr. et al. | 455/74.1 |
| 5,402,481 A | * 3/1995 | Waldman | 379/355.01 |
| 6,021,335 A | * 2/2000 | Zicker et al. | 455/564 |
| 6,035,220 A | * 3/2000 | Claudio et al. | 455/564 |
| 6,195,427 B1 | * 2/2001 | Hasen et al. | 455/564 |

* cited by examiner

Primary Examiner—Nay Maung

(57) ABSTRACT

A method, and apparatus for practicing the method, for eliminating the necessity for manually dialing, on a wireless telephone, a local area code as a prefix to a call within the same area code in telephone systems in which such action is a requirement. Before a calling party institutes a call on a cellular telephone, the area code is semi-permanently stored in the cellular telephone. During the dialing process, after the seventh digit has been dialed and before an eighth digit has been dialed, a determination is made as to whether the "send" button has been actuated. If so, then the stored area code is prefixed to the seven dialed digits, and the resulting ten digit number is transmitted. If not, then the dialing continues until the "send" button is actuated at which time the fully dialed number is transmitted. Typically, the latter condition indicates that a long distance call is in process. Thus, in a preferred embodiment, a determination is made that eleven digits have been dialed, and those eleven digits are transmitted. Because a cellular telephone is portable by nature, provision is made to update the automatically-prefixed area code when the cellular telephone is moved to a different area code.

8 Claims, 5 Drawing Sheets

PROGRAMMABLE AUTOMATIC PREFIX DIALER FOR WIRELESS

CROSS-REFERENCE TO RELATED APPLICATION

This is a Continuation-in-Part of co-pending U.S. patent application Ser. No. 08/811,710, filed Mar. 5, 1997, by Howard B. Rosen and Robert M. Nelson entitled TELEPHONE LINE AUTOMATIC PREFIX DIALER, now U.S. Pat. No. 5,859,896.

FIELD OF THE INVENTION

The invention relates to a method for automatically dialing a predetermined telephone number prefix, such as an area code, when using a wireless telephone, such as a cellular telephone, which method includes steps for selectively changing the predetermined telephone number prefix and for selectively overriding the automatic dialer. The invention also relates to an apparatus for carrying out the method.

BACKGROUND OF THE INVENTION

Local telephone calls have, for many years, been effected by dialing a seven digit code. At one time, all long distance calls were handled by "long lines" operators who more or less manually established a routing for a given call. However, since the late 1950's, direct dial long distance calling has been widely used. Directly dialed long distance calls involve the dialing of a first prefix, typically "1", to indicate to the telephone company apparatus that a long distance call is contemplated, then dialing a second prefix, the three digit area code, before the local seven digit number of the called party is dialed. In this manner, a long distance call can be carried out without the intervention of an operator. Variations of this process, typically dialing longer strings of numbers, permits international long distance direct dialing.

When this system was established, largely under the auspices of American Telephone and Telegraph Company, it was believed that the allocation of possible telephone numbers (including area codes) was adequate to handle all demand for many years. However, it is becoming evident that such is no longer the case. In particular, the remarkable proliferation in dedicated line demand for fax machines and the like, and, especially, for modems which may be used, inter alia, for connecting a computer to the Internet and other networks, has pushed the allocation of available lines, notwithstanding the application of various technological advances, to near the limit possible with the current system.

One technological advance which promises to alleviate this problem for a number of years is to require a calling party to dial the area code of a called party even when the two parties are within a common area code. Thus, one would be required to dial a ten digit code even if the called party is next door. It will be readily apparent that this change will be highly inconvenient to many persons who wish to continue the use of the traditional seven digit dialing for local calls. Accordingly it will be understood that a method and apparatus which, in such a contemplated modified telephone dialing system, permits the ongoing use of standard seven digit dialing for routine local calls from a telephone wired to a central facility would be highly desirable, and it is to this end that the invention described and claimed in the aforementioned U.S. Pat. No. 5,859,896 is directed.

A similar problem which arises in a technically substantially different communications device pertains to the use of wireless (e.g., cellular) telephones in an environment in which a caller will be required to enter the local area code prior to a entering a called party's seven digit number. Further, there is an additional distinction because a cellular telephone, by nature, is highly portable. Thus, the "local" area code is a variable as a cellular telephone is moved from one area code to another. Therefore, the present invention is directed to eliminating the need to manually enter an area code before instituting a local call from a cellular telephone and further provides for readily changing the local area code to be automatically entered ahead of the manually entered seven-digit number and also for permitting conventional use of a cellular telephone to make long distance calls.

OBJECTS OF THE INVENTION

It is therefore an object of the invention to provide an automatic prefix dialer which eliminates the necessity for a calling party to manually dial any predetermined code, such as an area code, prior to entering a called party's local telephone number from a wireless telephone.

It is also an object of the invention to provide a method which eliminates the necessity for the calling party to dial the predetermined code from a wireless telephone.

It is a more specific object of the invention to provide wireless telephone apparatus which effectively automatically transmits the predetermined code before a manually-entered local telephone number of the receiving party is transmitted.

It is a further object of the invention to provide a method wherein the predetermined code is automatically transmitted before the telephone number of the receiving party is transmitted.

In another aspect, it is an object of the invention to provide such method and apparatus which includes a feature which permits the dialing of the predetermined code to be selectively overridden when appropriate such as when a long distance call is contemplated.

In yet another aspect, it is an object of the invention to provide a method and apparatus by which the predetermined code may be easily changed as the wireless telephone is moved from area code to area code.

SUMMARY OF THE INVENTION

Briefly, these and other objects of the invention are achieved by a method, and apparatus for practicing the method, in which, before a calling party institutes a call on a cellular telephone, the area code is semi-permanently stored in the cellular telephone. During the dialing process, after the seventh digit has been dialed and before an eighth digit has been dialed, a determination is made as to whether the "send" button has been actuated. If so, then the stored area code is prefixed to the seven dialed digits, and the resulting ten digit number is transmitted. If not, then the dialing continues until the "send" button is actuated at which time the fully dialed number is transmitted. Typically, the latter condition indicates that a long distance call is in process. Thus, in a preferred embodiment, a determination is made that eleven digits have been dialed, and those eleven digits are transmitted. Because a cellular telephone is portable by nature, provision is made to update the automatically-prefixed area code when the cellular telephone is moved to a different area code.

DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENTS

Figure 1:
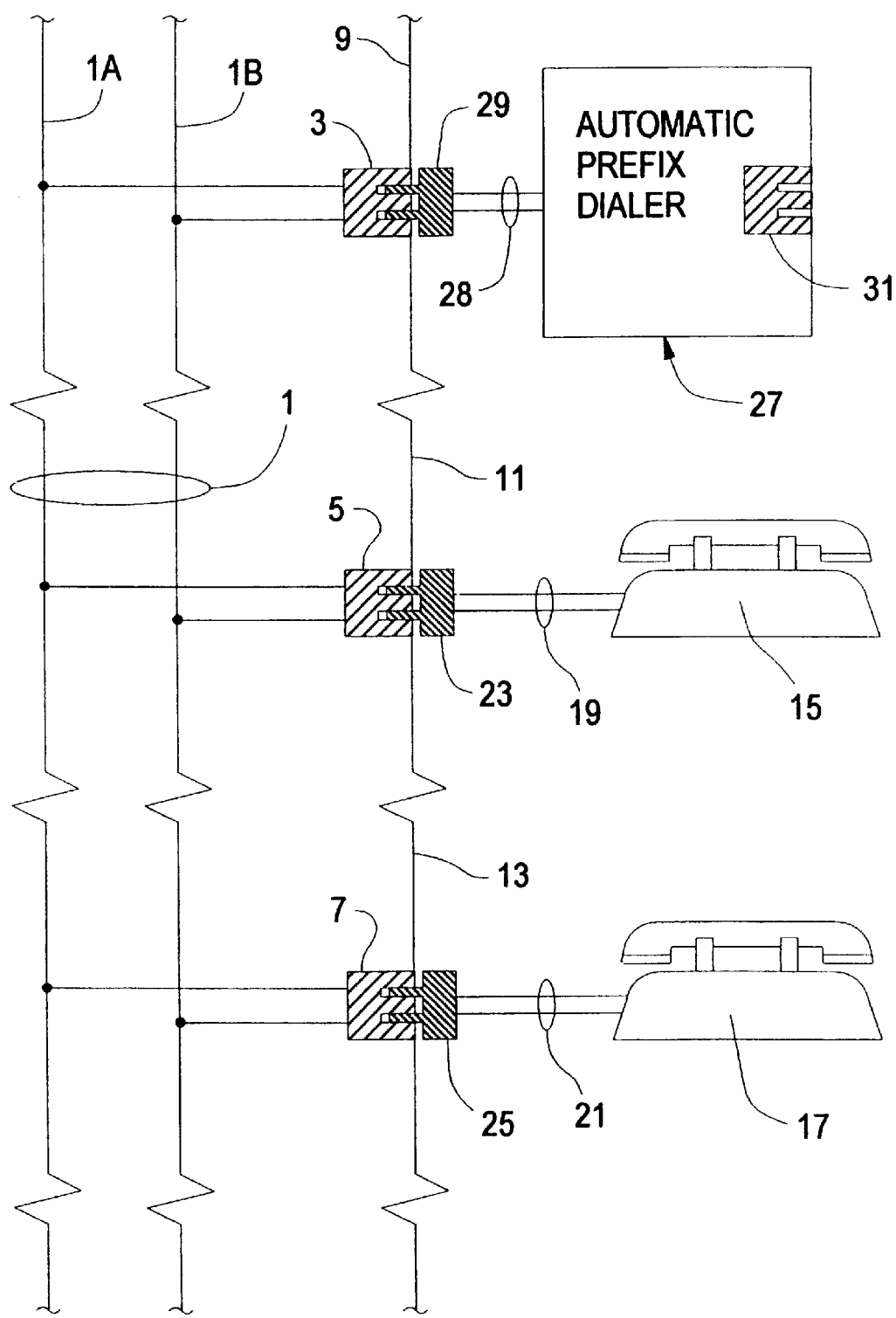
FIG. 1 illustrates a telephone arrangement in which wired telephone apparatus may be connected to achieve a similar result as disclosed and claimed in the afore-mentioned U.S. patent application Ser. No. 08/811,710.

Referring to FIG. 1 for a description of a representative environment relating to the invention described and claimed in the afore-mentioned U.S. patent application Ser. No. 08/811,710, filed Mar. 5, 1997, by Howard B. Rosen, entitled TELEPHONE LINE AUTOMATIC PREFIX DIALER, now U.S. Pat. No. 5,859,896, a telephone line 1, consisting of wires 1A and 1B, is connected to a plurality of sockets 3, 5 and 7, mounted on walls 9, 11 and 13, respectively, in a household. Telephones 15 and 17 are connected, via lines 19 and 21, respectively, to plugs 23 and 25 which are plugged into sockets 5 and 7, whereby the telephones 15 and 17 are conventionally connected to the telephone line 1. Although FIG. 1 illustrates a situation in which a single line services a plurality of telephones, the invention is equally applicable when the telephone line services only a single telephone as will be discussed below.

The automatic prefix dialer unit apparatus is illustrated generally at 27 in FIG. 1 and includes a plug 29, which mates with the socket 3, and a socket 31 which is similar to the socket 3. If the apparatus is remotely located from the socket 3, line pair 28 couples the prefix dialer unit 27 to the plug 29 as will be evident from FIG. 1. In addition, if the telephone line is servicing only a single telephone, then that telephone can be plugged into socket 31 of the prefix dialer unit 27. In fact, this would be possible even when the line 1 is servicing a plurality of telephone lines. This feature eliminates the possibility that a socket will have to be used solely for the prefix dialer unit 27. That is, both the apparatus 27 and a telephone can be plugged into the same socket 3.

Figure 2:
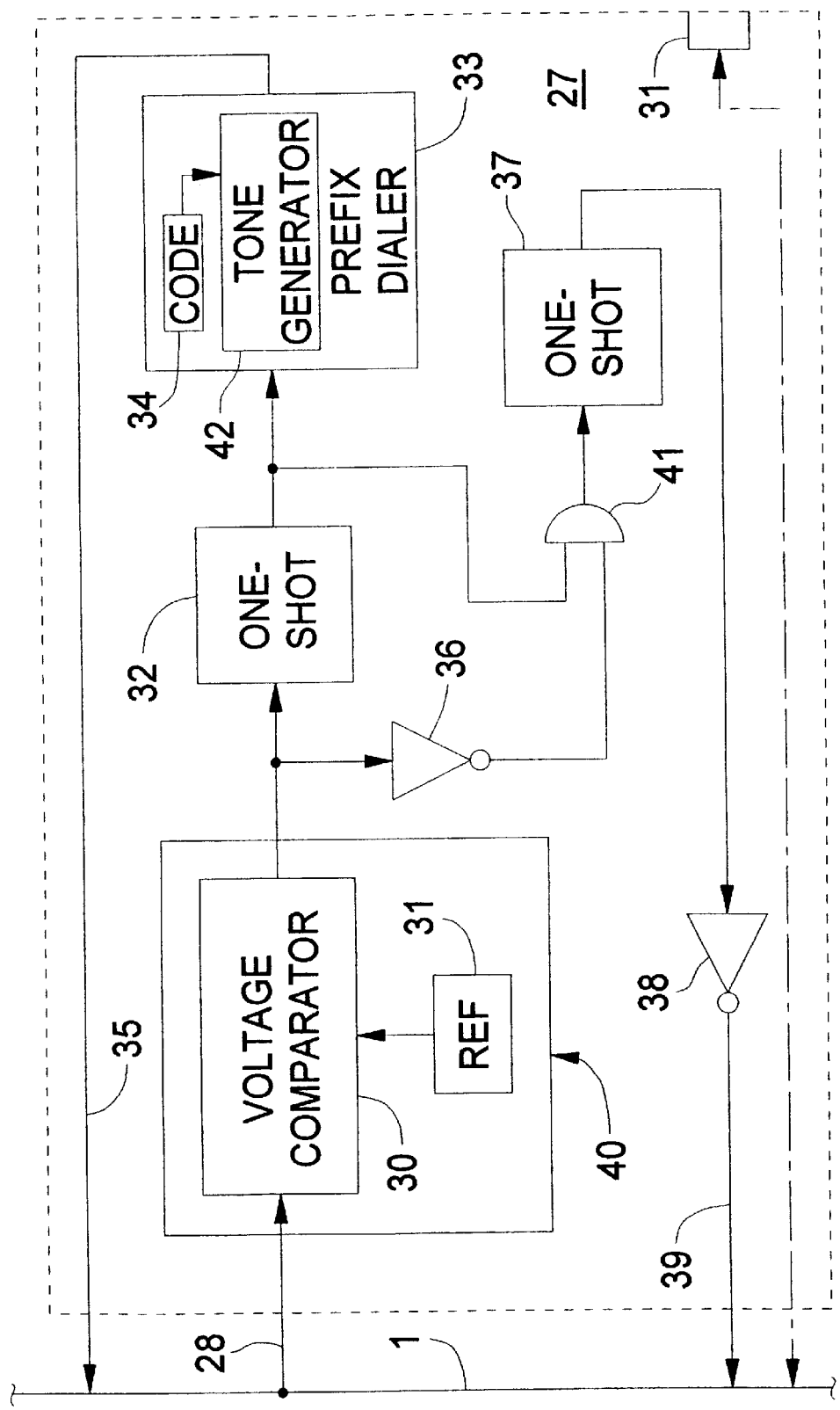
FIG. 2 is a schematic block diagram of an exemplary embodiment of the apparatus disclosed and claimed in the afore-mentioned U.S. patent application Ser. No. 08/8 11,710.

Attention is now directed to FIG. 2 which is a block diagram of an exemplary embodiment of the prefix dialer unit 27. (It will be understood by those skilled in he art that a physical implementation may take diverse forms.) For clarity, the circuitry illustrated in FIG. 2 is shown single ended, it being understood that a voltage reference, e.g., ground potential, is conventionally maintained throughout the circuitry.

Thus, in FIG. 2, the automatic prefix dialer unit 27 includes an off-hook detector 40 which, for example, employs a d-c voltage comparator 30 having a signal input connected to the telephone line 1 and a reference input which is fed with a reference voltage from a suitable source 31. As is well known in the art, when the line changes from an on-hook to an off-hook condition, as when one of the telephones 15, 17 (FIG. 1) is picked up, there is a consequent change in voltage—usually a decrease in voltage—across the line. This change is detected by comparator 33 which compares the voltage on the line with the reference voltage. Other arrangements could be used to detect the off-hook condition as well known in the art.

The output of the off-hook detector 30 is fed to the input of a first one-shot 32. When an off-hook condition is detected by the off-hook detector 40, a triggering signal is sent to the one-shot 32 which responds by issuing an output pulse of predetermined (by the selection of timing components as well known in the art) time length to a prefix dialer 33. A predetermined code, which, in the example, is the local three digit area code, is stored in a memory 34 in the prefix dialer 33.

The prefix dialer 33 responds to the leading edge of the output pulse from the one-shot 32 by dialing the predetermined code stored in memory 34, e.g., the local area code, to relieve the calling party from the necessity of taking this step while placing a local call. This is achieved by using the predetermined code to activate a conventional tone sequencer 42 which sends, via line 35, the appropriate tone sequence to the telephone line 1. (While a conventional pulse dialer can be used in place of the tone sequencer 42, the latter is preferred because it operates much more quickly.)

The automatic prefix dialer unit 27 responds sufficiently quickly to the sensed off-hook condition that the prefix dialing action of the dialer 33 is essentially transparent to the calling party. Accordingly, the predetermined code is automatically dialed each time the receiver of the telephone is lifted (or other appropriate action taken) to place the telephone line in an off-hook condition. Thus, the calling party does not have to go through the inconvenience of dialing the predetermined code each time a local call is made, nor is it possible for the calling party to inadvertently dial a local number without the predetermined code first having been dialed.

However, provision must be made for direct dialing a long distance number when desired, and the apparatus as described so far renders this operation impossible if it is the local area code which is stored in memory 34 as has been described. Still referring to FIG. 2, and, for convenience, assuming positive logic throughout, a positive signal (logic "1") from the off-hook detector 40, indicating that a telephone on the line has been picked up, triggers the one-shot 32 which issues a positive pulse (logic "1") to the prefix dialer 33 to initiate the dialing of the predetermined code stored in memory 34 as previously described. In addition, the output of the one-shot 32 is also connected to a first input of an AND-gate 41 and thus, at this time, delivers a logic "1" signal thereto until the one-shot 32 times out. Further, the output from the off-hook detector 40 is also connected to the input of an inverter 36. Thus, when the off-hook action is taken, a logic "1" signal is applied to the input of the inverter 36 such that its output is logic "0". The output of inverter 36 is connected to a second input to AND-gate 41 which is therefore not enabled under the conditions just described. The output of AND-gate 41 is connected to the trigger input of a second one-shot 37 which will therefore only be triggered when the AND-gate 41 is fully enabled.

The first one-shot 32 is configured to be non-retriggerable (i.e., application of a second trigger pulse while its output pulse is still logic "1" has no effect on the time length of the output pulse) and to have a time out which may be on the order of five to ten seconds, even though the prefix dialing operation rapidly takes place early in this time period. The second one-shot 37, however, has a substantially shorter time out which is greater than about 0.8 second, and is preferably about one to two seconds.

Consider now the operation of the apparatus when a user "flashes" the telephone handset shortly after picking it up; i.e., when the user quickly depresses and releases the flash hook plunger (or accordingly activates the corresponding device on a telephone which does not have a plunger) for less than about 0.8 second. If this step is taken before the first one-shot 32 has timed out, the prefix stored in memory 34 will already have been dialed by the prefix dialer 33, but the first input to the AND-gate 41 remains at logic "1".

When the user "flashes" the telephone, the output of the off-hook detector 40 briefly transitions to logic "0" and then back to logic "1". This second transition has no effect on the time out of the first one-shot 32 because it is configured as non-retriggerable. However, the first transition causes the output of the inverter, and hence, the second input to AND-gate 41 to briefly change to logic "1" which fully enables the AND-gate 41 to trigger the second one-shot 37. The output pulse from the second one-shot 37 is applied to the input of an inverting amplifier 38 which serves, during the time out period of the second one-shot 37, to place, via line 39, a suitable voltage on the line 1 to emulate a manual hang-up; i.e., to emulate an off-hook to on-hook transition. When the second one-shot 37 times out, the emulated hang-up condition is removed, and a dial tone is heard in the telephone handset. However, there is no action taken by the prefix dialer 33 as the one-shot 32 did not time out before the emulated hang-up operation was completed (which causes another trigger pulse to be applied, without effect, to the input of one-shot 32). The user is then free to dial the full long distance code desired from the telephone hand set, a result obtained by merely "flashing" the telephone shortly after picking up the handset or taking equivalent action with other types of telephones.

In the illustrated embodiment, the automatic prefix dialer unit 27 has been described as a separate unit. It will be apparent that the elements of device 27 can be integrated into the telephone instrument (15 or 17) so that it forms a part of the instrument.

As previously mentioned, the system described immediately above constitutes the subject matter disclosed and claimed in co-pending U.S. patent application Ser. No. 08/811,710, filed Mar. 5, 1997, by Howard B. Rosen and entitled TELEPHONE LINE AUTOMATIC PREFIX DIALER, now U.S. Pat. No. 5,859,896. However, achieving a similar feature in a wireless telephone (e.g., a cellular telephone) requires a different solution which must also take into account the inherent portability of such a communications device.

Figure 3:
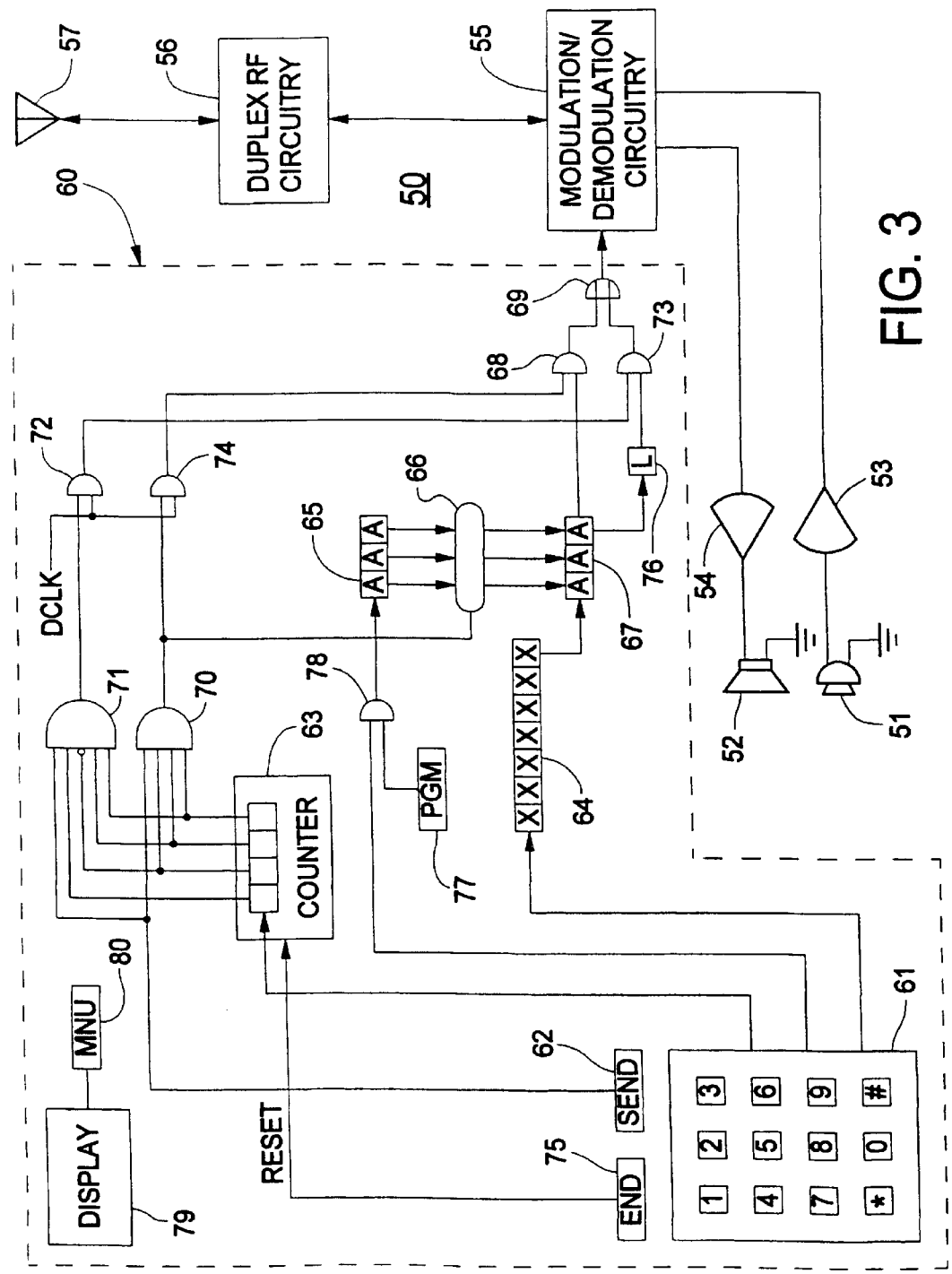
FIG. 3 is a partially block, partially schematic diagram of apparatus for practicing the present invention.

Thus, attention is now directed to FIG. 3 which is a high level functional block diagram of a cellular telephone 50 incorporating the present invention. As is conventional in the art, assuming that wireless communication has already been established between a party using the cellular telephone 50 and another party, conversation by the person using the cellular telephone is carried out by speaking into a microphone 51 and listening from a speaker 52. The microphone 51 conventionally transforms the sound pattern into an electrical signal which is amplified by audio amplifier 52 and then applied to modulation/demodulation circuit block 55. Modulation/demodulation circuit block 55 drives duplex RF circuitry block 56 which wirelessly transmits the signal from antenna 57. For incoming signals representing the voice of the other party, the antenna 57 intercepts the wireless signals and sends them to the modulation/demodulation circuit block 55 (via duplex RF circuitry block 56) where the demodulated audio signal is extracted, amplified by audio amplifier 54 and may be heard in speaker 52. This explanation and the circuitry presented is, of course, somewhat simplified, but is sufficient to provide a background for explaining the invention which is in the dialing apparatus 60 (and corresponding method) of the exemplary cellular telephone 50.

The dialing apparatus 60 includes a keypad 61 for entering digits during the dialing process. As the first seven digits are entered, they are serially transferred to a seven-character register (or the equivalent) 64. In addition, as each digit is entered via the keypad 61, a previously reset four-binary-digit counter 63 is incremented. An area code is semi-permanently stored in a three-character register (or the equivalent) 65, and the outputs from the register 65 are applied as parallel inputs to an AND-gate array 66. The outputs from the AND-gate array 66 are transferable in parallel to another three-character register (or the equivalent) 67. Thus, it will be understood that the area code semi-permanently stored in the three-character register 65 may be controllably transferred to the three-character register 67.

The seven-character register 64 and the three-character register 67 are serially concatenated such that a full ten-character number can be stored therein. The serial output from the three-character register 67 is applied as one input to an AND-gate 68 which drives one input to an OR-gate 69 which, in turn, controllably applies dialing digits to modulation/demodulation circuitry block 55.

The state (logic "1" or logic "0") of each of the four stages in the counter 63 is applied as one input to either or both of AND-gates 70, 71. More particularly, the positive logic outputs of the three lowest order stages of the counter 63 are applied as three of the four inputs to the AND-gate 70 whose fourth input is coupled to a send button 62 such that depressing the send button applies a logic "1" to the fourth input of the AND-gate 70. Thus, it will be seen that, only if the counter 63 has an immediate value of "0111" and the send button 62 has been depressed, will the AND-gate 70 be fully enabled.

The output from the AND-gate 70 is applied as a control input to the AND-gate array 66 such that, under this condition, the area code semi-permanently stored in the register 65 will be copied into the three-character register 67. In addition, the output from the AND-gate 70, under this condition, will also enable one input to another AND-gate 74 which has its other input driven by a dial clock signal DCLK. The output from the AND-gate 74, under this condition, will therefore be the dial clock which is applied as another input to the AND-gate 68. Accordingly, the ten digits serially stored in the seven-character register 64 and the three-character register 67 are clocked through the AND-gate 68, the OR-gate 69, and to the modulation/demodulation circuitry block 55 for transmission to the commercial facility to which the cellular telephone is subscribed to. Thus, it will be seen that a local call has been made by dialing a seven-digit number and depressing the send button 62, notwithstanding a system requirement to transmit ten digits including the local area code.

When a telephone conversation has been concluded, an end button 75 may be depressed to carry out the usual functions in the cellular telephone associated with that operation and also to apply a reset signal to the counter 63, thereby resetting its contents to "0000" in anticipation of the next telephone call to be originated at the cellular phone.

Consider now the operation of the dialing apparatus 60 when a conventional long distance call is to be dialed. In accordance with normal practice, a "1" is first dialed followed by the area code of the target telephone and then by the seven-digit number within the area code of the target telephone. It will be noted that not only is the three-character register 67 concatenated serially with the seven-character register 64, but also a single character register 76 is concatenated with the three-character register 67, thus providing for the serial storage of eleven characters.

Thus, if eleven characters are entered before the send button is depressed, the complete long distance telephone number is stored in the registers 64, 67, 76 in the correct order. In the meantime, the counter 63 will have counted up to "1011" The two lowest order stages of the counter 63 are applied as direct inputs to the AND-gate 71. In addition, the highest order stage is applied as a direct input. However, the second highest stage is applied to an inverting input to the AND-gate 71, and the "send" signal is applied as a fifth input. Accordingly, when the counter holds the count "1011" and the send button 62 is depressed, the AND-gate 71 is fully enabled, and its output is applied as a first input to another AND-gate 72 which has a second input driven by the dial clock signal DCLK. The output of the AND-gate 72 is applied as a second input to the AND-gate 73 whose first input is received from the single character register 76. Thus, the eleven character long distance number is clocked through the AND-gate 73 and the OR-gate 69 to the modulation/demodulation circuitry block 55 to be transmitted to the commercial service. When the call has been completed, touching the end button 75 will serve to once again reset the counter 63.

It has previously been noted that the local area code is semi-permanently stored in the three-character register 65. Because a cellular telephone is a portable apparatus, it may be desirable, when it is physically moved to another area code, to enter the new area code into the three-character register 65 for semi-permanent storage. This is readily achieved by depressing a program button 75 which enables one input to an AND-gate 78 and entering the three-character code from the keypad 61 which drives the other input to the AND-gate 78. The output from the AND-gate 78 is coupled to the three-character register 65 which thus receives the new area code for semi-permanent storage.

Figure 4:
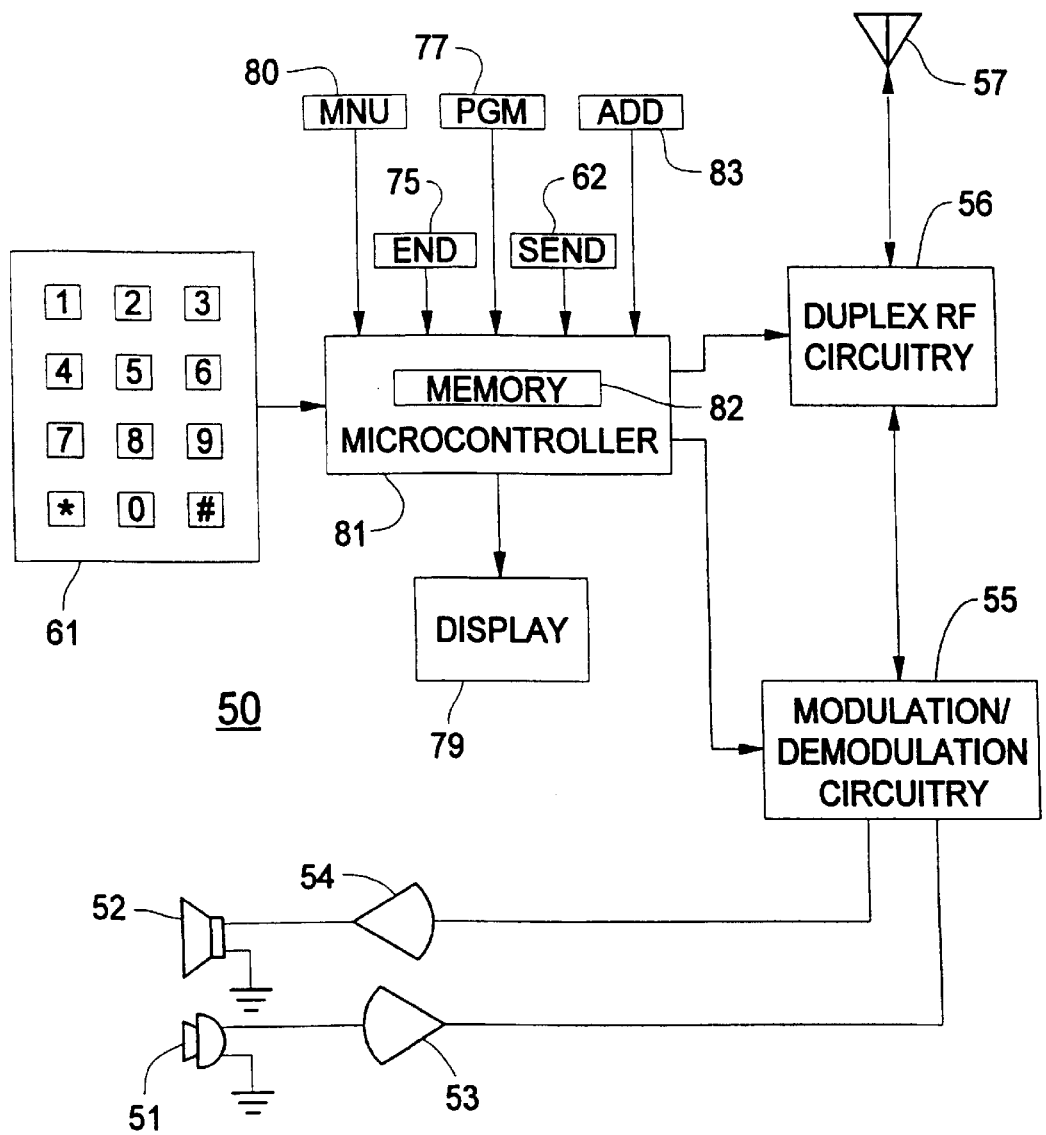
FIG. 4 is a block diagram of a more practical implementation of the present invention.

Those skilled in the art will appreciate that the apparatus shown in FIG. 3 is a synthesis of dialing procedures that can be controlled, as a practical matter, using a microcontroller which is a constituent of all modem cellular telephones. Referring now to FIG. 4, such cellular telephones typically include a microcontroller 81 with memory 82, an alphanumeric display 79 and various input devices including keypad 61, send button, 62, end button 75, program button 77, a menu access button 80 and additional buttons represented by the button 83. Control outputs from the microcontroller 81 coordinate operations among the keypad 61, control buttons 62, 75, 77, 80, 83, audio circuits/devices 51, 52, 53, 54, modulation/demodulation circuitry 55 and duplex RF circuitry 56. Accordingly, those skilled in the are will understand that the cellular telephone illustrated in FIG. 4 can, be programmed to carry out the inventive functions previously described with reference to FIG. 3.

Figure 5:
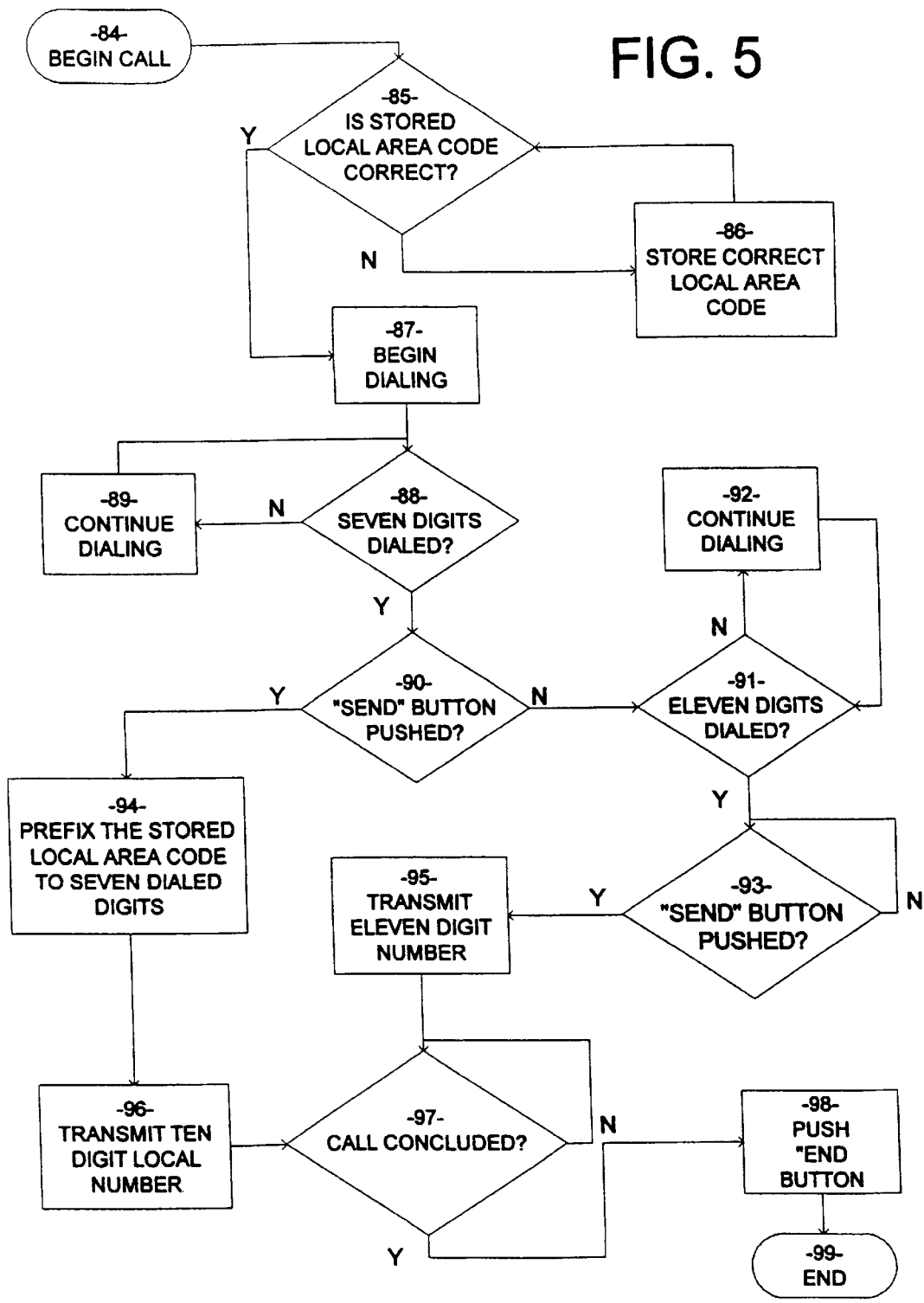
FIG. 5 is a detailed flow chart of the process of the present invention as practiced in the variant apparatus shown in FIGS. 3 and 4.

FIG. 5 is a detailed flow chart which clearly sets forth the method of the subject invention as it may be practiced in the exemplary cellular telephone illustrated in FIG. 4. A call is instituted at step 84, and a determination is made at step 85 as to whether the presently stored local area code is correct. If it is correct, the Y path will be followed out of step 85. As a practical matter, if the presently stored local area code is incorrect, the caller will intervene, using the menu, display and programming facilities of the cellular telephone, to invoke the N path out of step 85 and store the correct local area code at step 86 such that the Y answer will then be followed through step 85 after the change.

Next, at steps 88 and 89, dialing is carried out until seven digits have been dialed at which time, the Y path will be taken from step 88. Then, at step 89, if the "send" button is pushed within some suitable time (e.g., three seconds), the Y path will be taken from step 90. (Another satisfactory criteria for step 90 is that if an eighth digit is promptly, e.g., within three seconds, dialed, the N path will be taken from step 90. The effect sought by any suitable process is to take the Y path if only seven digits are dialed before the "send" button is actuated; if an eighth digit is dialed before the "send" button is actuated, the N path is taken from step 90.)

If the Y path is taken from step 90, the stored local area code is prefixed to the dialed seven digits at step 94, and the ten digit local number is transmitted to the service at step 96 to complete the dialing procedure by which a ten digit local is transmitted by dialing only seven digits. When it is determined that the call has concluded at step 97, the "end" pushbutton is actuated at step 98 to end the call, step 99.

If, on the other hand, the N path is taken from step 90, at steps 91 and 92, dialing continues until eleven digits have been dialed at which time, the Y path will be taken from step 91. Once the "send" button is actuated at step 93, the eleven digit (typically long distance) number is transmitted at step 95. When it is determined that the call has concluded at step 97, the "end" pushbutton is actuated at step 98 to end the call, step 99.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A method for automatically dialing an area code when a calling party institutes a call on a cellular telephone, which cellular telephone includes a "send" button for directing the transmission of a dialed number, and for selectively inhibiting the automatic dialing of the area code, the method including the steps of:

A) storing the area code in the cellular telephone;

B) during the dialing process, determining, after the seventh digit has been dialed and before an eighth digit has been dialed, whether the "send" button has been actuated;

C) if, during step B), it is determined that the "send" button has been actuated after the seventh digit has been dialed and before the eighth digit has been dialed, then prefixing the stored area code to the seven dialed digits and transmitting the resulting ten digit number; and D) if, during step B), it is determined that the "send" button has not been actuated after the seventh digit has been dialed and before the eighth digit has been dialed, then transmitting the number, in excess of seven digits, actually dialed.

2. The method of claim 1 in which step D) includes the substeps of:
 1) determining when eleven digits have been dialed; and
 2) when it is determined that eleven digits have been dialed, then transmitting the eleven digits as the number.

3. The method of claim 1 which further includes steps X), Y) and Z) carried out before step A), which steps Y) and Z) comprise:
 X) determining if the stored area code is correct;
 Y) if the stored area code is correct, then proceeding to step A); and
 Z) if the stored area code is not correct, storing the correct area, then proceeding to step A).

4. The method of claim 2 which further includes steps X), Y) and Z) carried out before step A), which steps Y) and Z) comprise:
 X) determining if the stored area code is correct;
 Y) if the stored area code is correct, then proceeding to step A); and
 Z) if the stored area code is not correct, storing the correct area, then proceeding to step A).

5. Apparatus for automatically dialing an area code when a calling party institutes a call on a cellular telephone, which cellular telephone includes a "send" button for directing the transmission of a dialed number, and for selectively inhibiting the automatic dialing of the area code, which apparatus includes:
 A) first means for storing the area code in the cellular telephone;
 B) second means for determining, during the dialing process, whether the "send" button has been actuated after a seventh digit has been dialed and before an eighth digit has been dialed;
 C) third means, responsive to a determination that the "send" button has been actuated after the seventh digit has been dialed and before the eighth digit has been dialed, for prefixing the stored area code to the seven dialed digits and transmitting the resulting ten digit number; and
 D) fourth means, responsive to a determination that the "send" button has not been actuated after the seventh digit has been dialed and before the eighth digit has been dialed, for transmitting the number, in excess of seven digits, actually dialed.

6. The apparatus of claim 5 which further includes, in the fourth means, apparatus for determining when eleven digits have been dialed and for transmitting the eleven digits as the number.

7. The apparatus of claim 5 which further includes apparatus for selectively changing the area code stored in the first means.

8. The apparatus of claim 6 which further includes apparatus for selectively changing the area code stored in the first means.

* * * * *